United States Patent [19]

Sato et al.

[11] 4,347,999

[45] Sep. 7, 1982

[54] HOLDER FOR A WIRE MEMBER

[75] Inventors: Toshio Sato, Yokohama; Yasuyuki Ogawa, Yokosuka, both of Japan

[73] Assignees: Nissan Motor Company, Limited; Kato Hatsujo Kaisha Limited, both of Yokohama, Japan

[21] Appl. No.: 123,689

[22] Filed: Feb. 22, 1980

[30] Foreign Application Priority Data

Feb. 26, 1979 [JP] Japan .............................. 54/22882[U]

[51] Int. Cl.³ ............................................... F16L 3/12
[52] U.S. Cl. ..................................... 248/73; 248/74 B
[58] Field of Search .............. 248/71, 73, 74 R, 74 A, 248/74 B, 74 PB, 68 R; 411/41, 40, 39, 44; 427/290, 327; 29/527.4, 530

[56] References Cited

U.S. PATENT DOCUMENTS

| 2,387,295 | 10/1945 | Robertson | 248/74 B |
| 2,528,288 | 10/1950 | Rublee | 248/71 |
| 2,992,801 | 7/1961 | Lander | 248/74 B |
| 3,085,129 | 4/1963 | Anderson | 248/71 X |
| 3,159,708 | 12/1964 | Deal | 248/74 B X |
| 3,176,945 | 4/1965 | Anderson | 248/71 |
| 4,068,366 | 1/1978 | Hillesheim | 29/527.4 |

FOREIGN PATENT DOCUMENTS

| 1355463 | 2/1964 | France | 411/41 |
| 1163400 | 9/1969 | United Kingdom | 411/41 |

Primary Examiner—Stephen J. Novosad
Attorney, Agent, or Firm—Thompson, Birch, Gauthier & Samuels

[57] ABSTRACT

A holder for firmly holding a wire including a clip having a head and a leg extending therefrom, and a long and thin holding member coated with a coating material on substantially the entire area of the front side, back side, and both edges of the holding member. The holding member has a through hole in one end portion thereof for inserting the leg of the clip. The holding member is bendable so as to hold the wire member.

9 Claims, 7 Drawing Figures

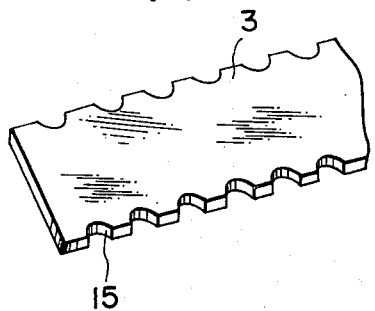
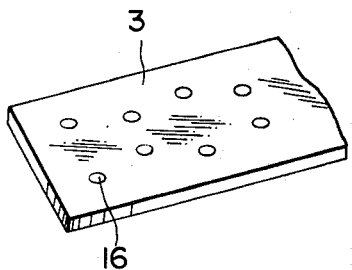
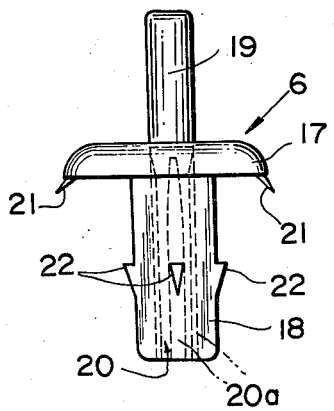
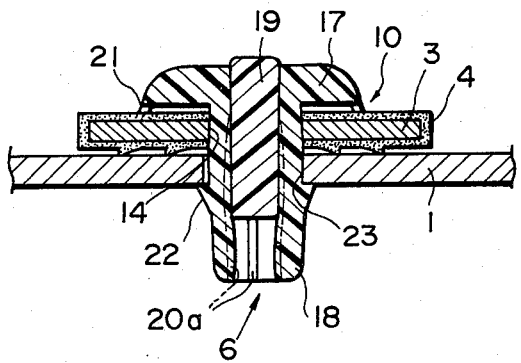

HOLDER FOR A WIRE MEMBER

BACKGROUND OF THE INVENTION

The present invention relates to a holder for firmly holding a wire rod or the like.

FIG. 1 shows a conventional holder 10 for holding an electric wire 2. The holder 10 is composed of a relatively long strip 3 made of a metallic material and a coating portion 8 made of a synthetic resin for protecting a desired part of the strip 3. One end of the strip 3 is exposed to constitute a fixing portion 9. The back side of the fixing portion 9 is fixed by welding means on a portion of, for example, a vehicle body (not shown). The strip 3 is bent together with the coating 8 so as to hold the wire 2.

The coating portion 8 covers only a part of the strip 3 but not the whole thereof because one end of the strip 3 must be exposed for the purpose of welding. It requires relatively complicated production steps to form a coating portion on only a selected part of the strip 3. Also, the exposed portion of the strip 3 is apt to rust particularly where it contacts the metallic portion of the vehicle body. In addition, the coating portion is easy to separate from the strip 3. Because each holder must be welded on the vehicle body, the efficiency of labor is decreased.

SUMMARY OF THE INVENTION

An object of the present invention is to eliminate the defects of the prior art.

A further object of the present invention is to provide a holder for holding a wire or the like which can be easily mass-produced.

Still a further object of the present invention is to provide a holder which does not rust.

Another object of the present invention is to provide a holder wherein the efficiency of labor can be increased.

According to the present invention, a holder for firmly holding a member such as a wire rod comprises a long and thin holding member and a clip which is fixed on one portion of the holding member. The clip includes a head and a leg extending therefrom. It is preferable that the clip further comprises a rod which is inserted into a hole formed through the head and leg of the clip. The holding member is coated with a coating material such as a synthetic resin on substantially the entire area of the front side, back side, and both edges of the holding member. The holding member has a through hole on one end portion thereof into which is inserted the leg of the clip. In order to hold the wire or the like, the holding member is bent. Preferably, the holding member includes a long strip made of a metallic material. In order to increase the binding force between the plate and the coating material thereon, a plurality of holes or notches may be formed on the strip. In addition, it is preferable that an irregular surface, for example, like the teeth of a saw, be formed on the back side of the holding member and particularly in the coating material coated on the strip.

BRIEF DESCRIPTION OF THE DRAWINGS

FIG. 4 is a perspective view showing a further embodiment of the present invention;

FIG. 5 is a perspective view showing a still further embodiment of the present invention;

FIG. 6 is a front view of the clip as shown in FIG. 2; and

FIG. 7 is a sectional view showing a holder according to the present invention which is fixed on a vehicle body.

DETAILED DESCRIPTION OF THE PREFERRED EMBODIMENTS

Figure 1:
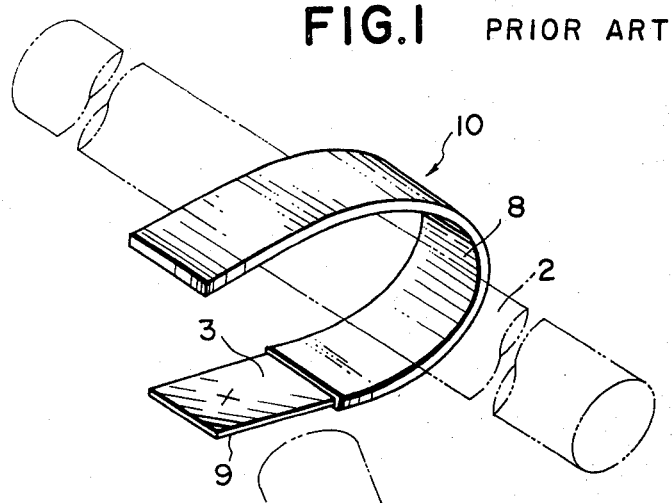
FIG. 1 is a perspective view showing a conventional holder.
Figure 2:
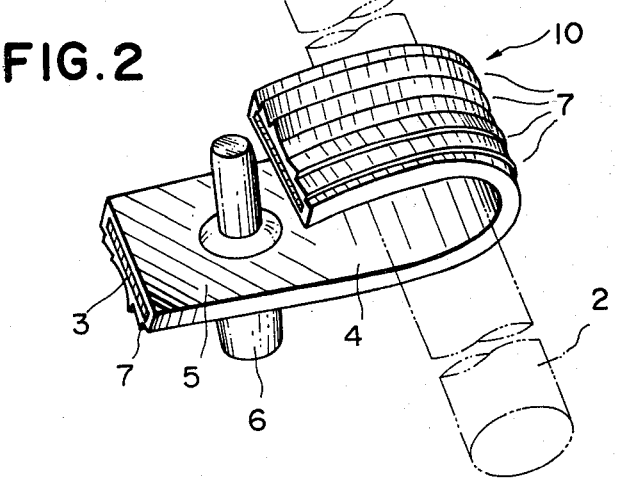
FIG. 2 is a perspective view showing a holder according to a preferred embodiment of the present invention.
Figure 3:
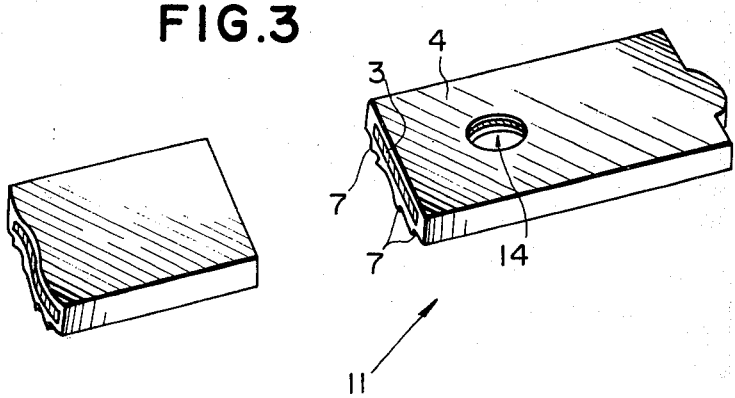
FIG. 3 is a perspective view in which a holding member as shown in FIG. 1 is cut off in its lateral direction.

FIG. 2 shows a first embodiment of the present invention. The holder 10 includes the holding member 4 and the clip 6. The holding member 4 can be made by forming a coating portion 8 made of a synthetic resin or the like over the whole surface of the long strip 3 made of a metallic material so as to produce a long body 11 to produce a number of holding members 4 and then cutting off the long body 11. It is preferable to form a saw-tooth like irregular surface 7 on the back side of the holding member 4. The clip 6 is fixed near one end of the holding member 4. The holding member 4 is attached by the clip 6 onto the vehicle body. The holding member 4 is bent in such a way that it can hold securely the wire 2.

The irregular surface 7 on the back side of the holding member 4 acts to prevent lateral displacement of the holding member relative to the vehicle body when it is bent. Therefore, it is preferable that the irregular surface 7 is formed like the teeth of a saw. In order to facilitate the mass-production of the holder 10, the irregular surface 7 should be formed on one side of the long body 11 when it is coated with a coating material such as a synthetic resin. Also, a through hole 14 into which clip 6 is fitted is preferably formed in one end portion of the holding member 4 when the long body 11 is cut off.

FIG. 4 shows a further embodiment of the present invention. The long strip 3 has at its edges a plurality of notches 15 which are preferably formed before the strip 3 is coated with a coating material.

FIG. 5 shows another embodiment of the present invention. The long strip 3 has a plurality of depressions or holes 16 which are preferably formed in both sides of the long strip 3 before it is coated with the coating material.

The strip 3 as shown in FIGS. 4 and 5 are coated with a coating material in such a way that the appearance thereof becomes substantially the same as shown in FIG. 2. The binding force between the strip 3 and the coating material is increased because the notches 15, holes or depressions 16 or the like which are formed in the strip 3. Therefore, when the holding member 4 is bent, the coating material is prevented from separating from the strip 3 whereby the exposure of the strip 3 is avoided.

As shown in FIG. 6, the clip 6 includes head 17 and leg 18 which are axially aligned and made of a synthetic resin as one body. A through hole 20 is formed in the head 17 and leg 18 at their center. The clip 6 also includes rod 19 which is inserted into the through hole 20. The inner surface of the through hole 20 has a plurality of projections 20a extending in its longitudinal direction. The rod 19 pushes the projections 20a outwards so as to enlarge the outer diameter of the leg 18. The head 17 has at its lower edge a plurality of projections 21 each tip of which is sharp. A plurality of stopping portions 22 are provided on an intermediate portion of the outer surface of the leg 18 for the purpose of fixing the holding member 4 between the vehicle body 1 and the sharp projections 21 of the head 17.

The holder 10 according to the present invention is used, for example, as shown in FIG. 7. First, the leg 18 of the clip 6 is inserted into the through hole 14 of the holding member 4. The head 17 of the clip 6 stops against the front side of the holding member 4 while the clip 6 is held in the through hole 14 of the holding member 4. The leg 18 of the clip 6 is further inserted into one of the through holes 23 formed in the desired portion of the vehicle body 1. Thereafter, the rod 19 of the clip 6 is pushed into the hole 20 of the clip 6. As a result, the leg 19 of the clip 6 is enlarged in diameter so that the stopping portions 22 stop and support the back side of the vehicle body 1. Thus the holding member 4 is fixed on the vehicle body 1.

The sharp projections 21 on the head 17 of the clip 6 protrude into the coating material coated on the surface of the strip 3 when the rod 19 is pushed into the hole 20 of the clip 6, so that the clip 6 is prevented from rotating relative to the holding member 4.

The embodiments as above-stated are only illustrative and not restrictive. For example, the configuration of the clip 6 can be easily changed by those skilled in the art within the scope of the present invention. The material of the clip 6 is not limited to a synthetic resin. Although the irregular surface 7 is formed on the whole area of the back side of the holding member 4 in the above-mentioned embodiments, such irregular portions can be formed on solely a selected area of the holding member 4 and for example on one end portion 5 thereof.

According to the present invention, as can be seen from the foregoing, a very long strip can be coated once with a coating material such as a synthetic resin so as to produce a very long body, and thereafter such a long body can be cut off to produce a plurality of holding members 4. Thus the mass-production of the holders can be facilitated, resulting in the reduction of the production cost thereof as compared with the prior art. Also, because the metallic strip of the holding member does not directly contact the vehicle body, it can be kept from rusting. The holder can be easily fixed to the vehicle body by means of the clip without welding or the like. In case the strip 3 of the holding member has the holes or notches therein, any separation between the strip and the coating material thereon can be completely avoided. When the wire or the like is arranged on the vehicle body, the working efficiency can be increased because the holding member is positively fixed on the vehicle body by the irregular surface of the back side of the holding member so that the holding member is prevented from rotating.

What is claimed is:

1. A holder for firmly holding a wire member comprising:
    a clip including a head and a leg extending from said head; and
    a long and thin holding member coated with a coating material on substantially the entire area of the front side, the back side, and both edges thereof, said holding member having a through hole in one end portion thereof through which said clip leg is inserted, said holding member being bendable for holding the wire member,
    said coated material on said holding member back side having an irregular exterior surface, said irregular surface having a jagged saw-tooth profile running across the width of said holding member, and having parallel saw-tooth peaks and parallel saw-tooth valleys running along the length of said holding member.

2. The holder of claim 1 wherein said holding member comprises an initially long metallic strip which is coated with coating material and is transversely cut into a plurality of shorter pieces.

3. The holder of claim 2 wherein said holding member end portion through hole has a location, shape and orientation such that is is formed simultaneously when said holding member end portion is cut off.

4. The holder of claim 1 wherein said holding member includes a long strip covered with said coating material, said strip being made of a metallic material, said strip including a plurality of small surface irregularities formed therein.

5. The holder of claim 1 wherein said clip includes a clip hole formed through the center of said clip head and leg, said clip also including a rod adapted to be inserted into said clip hole to fix said clip onto a body.

6. The holder of claim 5 wherein said clip head and said clip leg are formed as a single resin unit.

7. The holder of claim 6 wherein the inner surface of the leg portion of said clip hole has a plurality of inwardly and longitudinally extending projections, said rod contacting said projections as it is inserted into and moves along said clip hole, said rod driving said projections outwardly causing the outer diameter of said clip leg to expand.

8. The holder of claim 7 wherein the exterior surface of said clip leg has a plurality of stopping portions formed thereon for assisting in the fixing of said holding member onto a body.

9. The holder of claim 5 wherein said clip head has on its lower side a plurality of sharp projections, said projections digging into said holding member coated front side as said rod is inserted into said clip hole, said sharp projections preventing relative rotation between said clip and said holding member.

* * * * *

UNITED STATES PATENT AND TRADEMARK OFFICE
CERTIFICATE OF CORRECTION

PATENT NO. : 4,347,999
DATED : September 7, 1982
INVENTOR(S) : Toshio Sato and Yasuyuki Ogawa It is certified that error appears in the above—identified patent and that said Letters Patent are hereby corrected as shown below:

Claim 3, Column 4, line 28, cancel "is", first occurrence, and insert --it--.

Signed and Sealed this

Seventeenth Day of May 1983

[SEAL]

Attest:

DONALD J. QUIGG

Attesting Officer

Acting Commissioner of Patents and Trademarks